United States Patent
Lee

(10) Patent No.: US 10,611,457 B2
(45) Date of Patent: Apr. 7, 2020

(54) ILLUMINATING SIDEWALL SYSTEMS AND METHODS FOR AN INTERNAL CABIN OF A VEHICLE

(71) Applicant: THE BOEING COMPANY, Chicago, IL (US)

(72) Inventor: Ethan Lee, Bellevue, WA (US)

(73) Assignee: THE BOEING COMPANY, Chicago, IL (US)

(*) Notice: Subject to any disclaimer, the term of this patent is extended or adjusted under 35 U.S.C. 154(b) by 133 days.

(21) Appl. No.: 15/895,037

(22) Filed: Feb. 13, 2018

(65) Prior Publication Data

US 2019/0248466 A1 Aug. 15, 2019

(51) Int. Cl.
*B60Q 3/41* (2017.01)
*B64C 1/14* (2006.01)
*B64D 11/00* (2006.01)

(52) U.S. Cl.
CPC .............. *B64C 1/1492* (2013.01); *B60Q 3/41* (2017.02); *B64D 11/00* (2013.01); *B64D 2011/0038* (2013.01)

(58) Field of Classification Search
CPC ... F21V 2200/15; F21V 2200/20; B60Q 3/41; B60Q 3/43; B60Q 3/62–68; B60Q 3/74; B60Q 3/745; B64D 2011/0038; F21W 2107/30; B64C 1/1492
See application file for complete search history.

(56) References Cited

U.S. PATENT DOCUMENTS

| 5,647,658 A * | 7/1997 | Ziadi ...................... B64D 11/00 362/471 |
| 9,527,437 B2 | 12/2016 | Valentine |
| 9,902,314 B1 * | 2/2018 | Salter ...................... B60Q 1/268 |
| 2003/0048641 A1 * | 3/2003 | Alexanderson ....... F21V 29/004 362/470 |
| 2008/0266887 A1 * | 10/2008 | Wentland ................ B64C 1/066 362/470 |
| 2016/0238215 A1 * | 8/2016 | Ohta ...................... B64D 11/00 |

* cited by examiner

*Primary Examiner* — Anh T Mai
*Assistant Examiner* — Steven Y Horikoshi
(74) *Attorney, Agent, or Firm* — The Small Patent Law Group LLC; Joseph M. Butscher

(57) ABSTRACT

An illuminating sidewall system for an internal cabin of a vehicle includes a sidewall panel including a lateral segment connected to a ceiling segment, and at least one window. At least one lighting assembly includes a first portion secured to the lateral segment and a second portion secured to the ceiling segment. The lighting assembl(ies) is configured to emit light onto interior surfaces of one or both of the lateral segment and/or the ceiling segment.

20 Claims, 7 Drawing Sheets

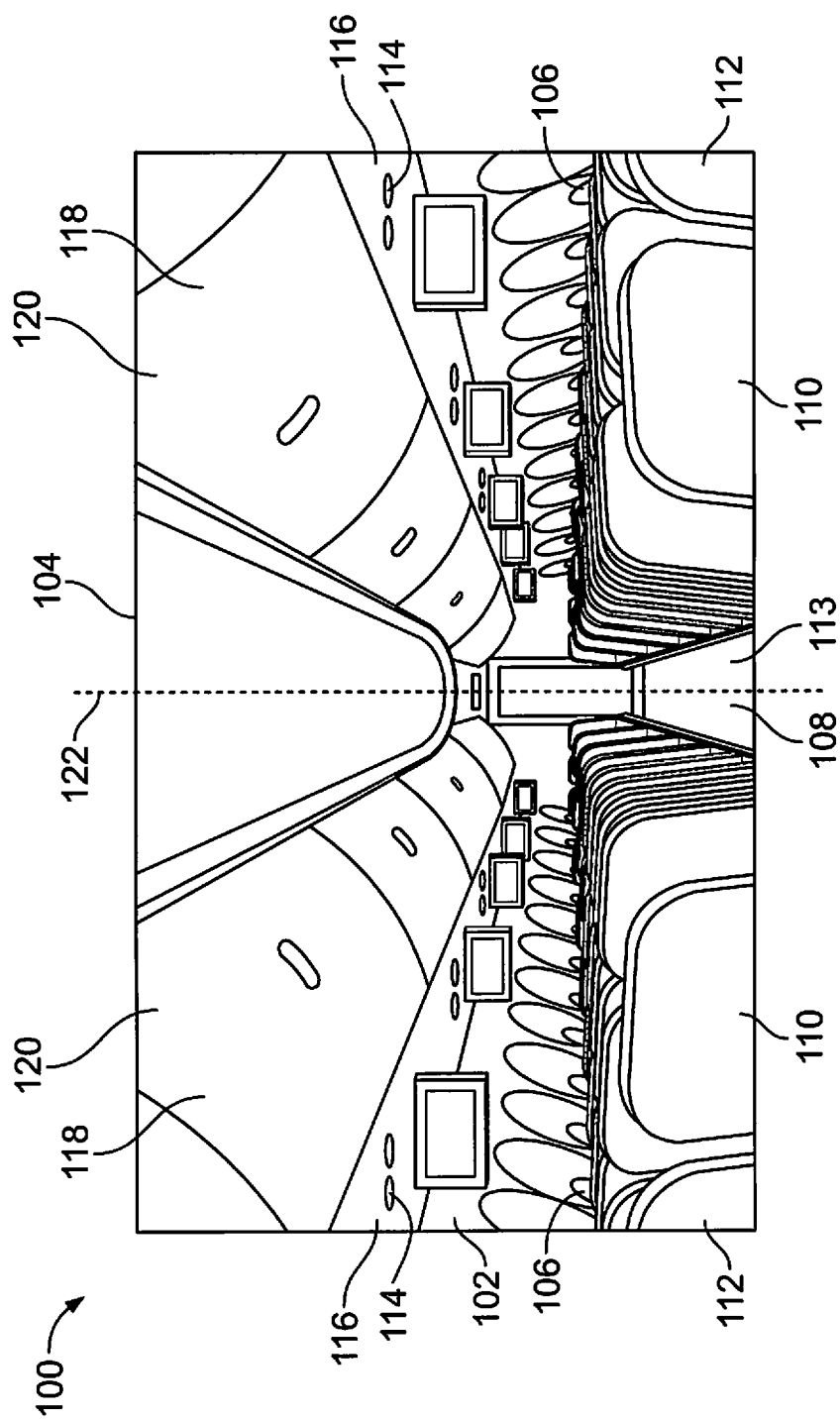

US 10,611,457 B2

ILLUMINATING SIDEWALL SYSTEMS AND METHODS FOR AN INTERNAL CABIN OF A VEHICLE

FIELD OF EMBODIMENTS OF THE DISCLOSURE

Embodiments of the present disclosure generally relate to sidewall panels within an internal cabin of a vehicle, and, more particularly, to illuminating sidewall systems.

BACKGROUND OF THE DISCLOSURE

Commercial aircraft typically include an internal cabin that may be divided into numerous sections. A cockpit is generally separated from a passenger cabin, which may include a first class section, a business class section, and a coach section. The passenger cabin may also include one or more work areas for flight personnel, such as galleys, which may include food and beverage storage structures. One or more aisles pass through the passenger cabin and connect each of the passenger sections to one or more paths to one or more doors of the aircraft.

The internal cabin is typically defined by interior sidewalls that connect to a ceiling and a floor. The sidewalls include windows that allow passengers to see outside of the aircraft.

Certain airline providers may prefer to customize portions of the sidewalls with graphics, for example. In at least some situations, it may be desired to change such customized features during or between flights, for example.

However, various known sidewalls within aircraft are not configured to be adaptively changed. Moreover, certain passengers may find sidewalls within aircraft to be aesthetically sterile and plain.

SUMMARY OF THE DISCLOSURE

A need exists for a system and method of adaptively modifying sidewalls within an internal cabin of a vehicle. Further, a need exists for a system and method that allows for adaptive customization of portions of sidewalls within an internal cabin of an aircraft. Additionally, a need exists for an inviting, aesthetically-pleasing sidewall within an internal cabin of an aircraft.

With those needs in mind, certain embodiments of the present disclosure provide an illuminating sidewall system for an internal cabin of a vehicle. The illuminating sidewall system includes a sidewall panel including a lateral segment connected to a ceiling segment, and at least one window. At least one lighting assembly includes a first portion secured to the lateral segment and a second portion secured to the ceiling segment. The lighting assembl(ies) is configured to emit light onto interior surfaces of one or both of the lateral segment and/or the ceiling segment. In at least one embodiment, the lighting assembl(ies) has an inverted L-shaped profile that conforms to a profile of the sidewall panel.

The first portion may be secured to a rear surface of the lateral segment. The second portion may be secured to an upper surface of the ceiling segment.

In at least one embodiment, the first portion and/or the second portion are configured to emit the light towards the window(s).

The first portion and/or the second portion may be disposed at a first end of the sidewall panel. The first end may be a fore end or an aft end.

The lighting assembl(ies) may include a third portion that extends along a length of the ceiling segment. In at least one embodiment, the third portion is proximate to a front edge of the ceiling segment.

In at least one embodiment, the lighting assembly is separate and distinct from a personal service unit.

The sidewall panel may include at least one light-transmissive indicia. At least a portion of the lighting assembl(ies) may be positioned behind the light-transmissive indicia. The lighting assembl(ies) is configured to emit the light through the light-transmissive indicia.

The lighting assembly may include one or more light emitting diodes (LEDs).

In at least one embodiment, a lighting control unit is coupled to the lighting assembly. The lighting control unit is configured to control operation of the lighting assembl(ies).

Certain embodiments of the present disclosure provide an illuminating sidewall method for an internal cabin of a vehicle. The illuminating sidewall method includes providing a sidewall panel (including a lateral segment connected to a ceiling segment, and at least one window), mounting a first portion of at least one lighting assembly to the lateral segment, mounting a second portion the light assembl(ies) to the ceiling segment, and emitting light from the lighting assembl(ies) onto interior surfaces of one or both of the lateral segment and the ceiling segment.

Certain embodiments of the present disclosure provide a vehicle that includes an internal cabin, and an illuminating sidewall system within the internal cabin, as described herein.

BRIEF DESCRIPTION OF THE DRAWINGS

FIG. 3 illustrates a perspective interior view of an internal cabin of an aircraft, according to an embodiment of the present disclosure.

DETAILED DESCRIPTION OF THE DISCLOSURE

Figure 1:
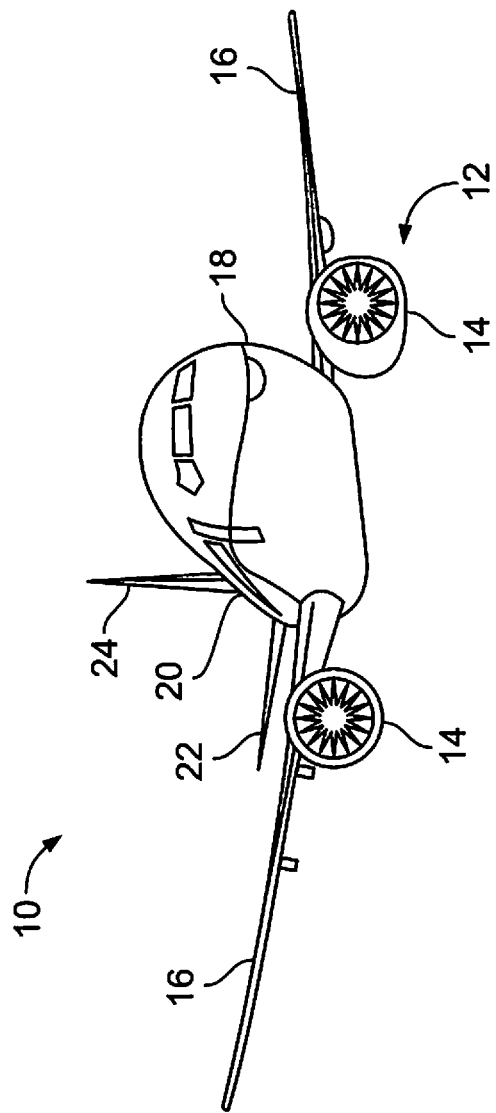
FIG. 1 illustrates a perspective front view of an aircraft, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide an illuminating sidewall system including a sidewall panel including a lateral segment that connects to a ceiling segment. The ceiling segment may form a portion of a ceiling panel within an interior cabin of a vehicle. One or more lighting assemblies extend over at least portions of the lateral segment and the ceiling segment. In at least one embodiment, the lighting assembl(ies) form an inverted L-shape that extends over a portion of the sidewall panel. The lighting assembl(ies) are configured to emit light onto an interior front surface of the sidewall panel. The illuminating sidewall system provides illuminated, three-dimensional effects. The lighting assemblies emit light onto the lateral segment and the ceiling segment, thereby providing an illuminated transition therebetween (for example, a transition from vertical to horizontal). In this manner, the illuminating sidewall system is configured to provide lighting effects other than merely vertical down-lighting, which provides an aesthetically inviting and pleasing illuminated environment.

The illuminating sidewall system creates an L-shaped illumination in relation to the sidewall panel. Embodiments of the present disclosure provide a distinctive light wash in relation to the sidewall panel.

Each lighting assembly includes one or more light-emitting elements (such as light-emitting diodes) that may be controlled to provide a plurality of lighting effects. For example, the light-emitting elements may be operated to selectively change a color of emitted light. In at least one embodiment, the light-emitting elements are configured to emit light over a color range including red-orange-yellow-green-blue-indigo-violet, and mixtures of light therebetween. The lighting assembly may be operatively coupled to a lighting control unit that is configured to control the operation of the lighting assembly.

The lighting assembly may be operated to provide adaptable lighting features that are emitted onto the sidewall panel to (for example, onto) a side of and/or over a window. The lighting features may be selectively modified and changed, depending on desired lighting within the internal cabin.

The illuminating sidewall system is configured to provide a selective warm and intimate setting within the internal cabin of the vehicle. Further, the illuminating sidewall system allows a provider to customize lighting and effects thereof for branding purposes. For example, an airline may select one or more colors that are associated with the airline. The illuminating sidewall system may be operated to illuminate such colors in relation to the sidewall panel.

In at least one embodiment, the sidewall panel may include light-transmissive indicia. For example, the light-transmissive indicia may include wayfinding characters such as seat numbers. Light emitted by the lighting assembly passes through the light-transmissive indicia, thereby illuminating the light-transmissive indicia. In at least one other embodiment, the light-transmissive indicia may include company names, slogans, or the like.

Embodiments of the present disclosure provide illuminating sidewall systems and methods that provide additional lighting options within an internal cabin, customizable lighting effects that allow for selectively adaptable lighting effects, and optional illuminated wayfinding features.

FIG. 1 illustrates a perspective top view of a vehicle, such as an aircraft 10, according to an embodiment of the present disclosure. The aircraft 10 includes a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin, which may be defined by interior sidewall panels that connect to a ceiling and a floor. The internal cabin may include a cockpit, one or more work sections (for example, galleys, personnel carry-on baggage areas, and the like), one or more passenger sections (for example, first class, business class, and coach sections), and an aft section in which an aft rest area assembly may be positioned. Each of the sections may be separated by a cabin transition area, which may include one or more class divider assemblies. Overhead stowage bin assemblies may be positioned throughout the internal cabin.

Alternatively, instead of an aircraft, embodiments of the present disclosure may be used with various other vehicles, such as automobiles, buses, locomotives and train cars, seacraft, spacecraft, and the like.

Figure 2A:
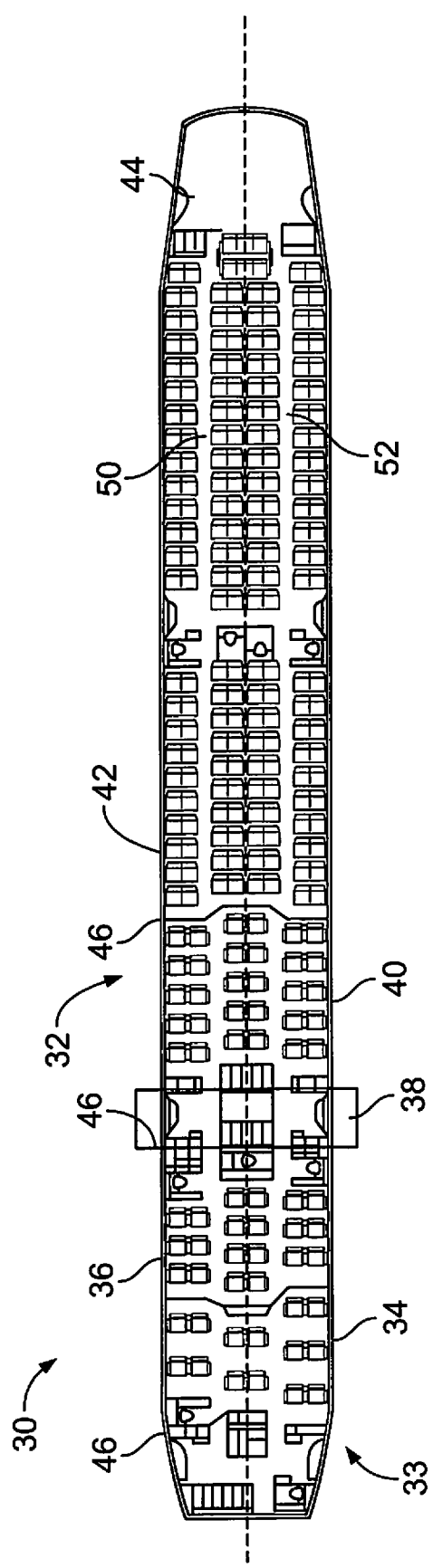
FIG. 2A illustrates a top plan view of an internal cabin of an aircraft, according to an embodiment of the present disclosure.

FIG. 2A illustrates a top plan view of an internal cabin 30 of an aircraft, according to an embodiment of the present disclosure. The internal cabin 30 may be within a fuselage 32 of the aircraft. For example, one or more fuselage walls may define an interior of the internal cabin 30. The interior of the internal cabin 30 is defined by sidewall panels that connect to a ceiling and a floor. The sidewall panels include lateral segments that connect to ceiling segments. The lateral segments define lateral wall portions, while the ceiling segments define at least portions of the ceiling within the internal cabin 30.

The internal cabin 30 includes multiple sections, including a front section 33, a first class section 34, a business class section 36, a front galley station 38, an expanded economy or coach section 40, a standard economy or coach section 42, and an aft section 44, which may include multiple lavatories and galley stations. It is to be understood that the internal cabin 30 may include more or less sections than shown. For example, the internal cabin 30 may not include a first class section, and may include more or less galley stations than shown. Each of the sections may be separated by a cabin transition area 46.

As shown in FIG. 2A, the internal cabin 30 includes two aisles 50 and 52 that lead to the aft section 44. Optionally, the internal cabin 30 may have less or more aisles than shown. For example, the internal cabin 30 may include a single aisle that extends through the center of the internal cabin 30 that leads to the aft section 44.

Figure 2B:
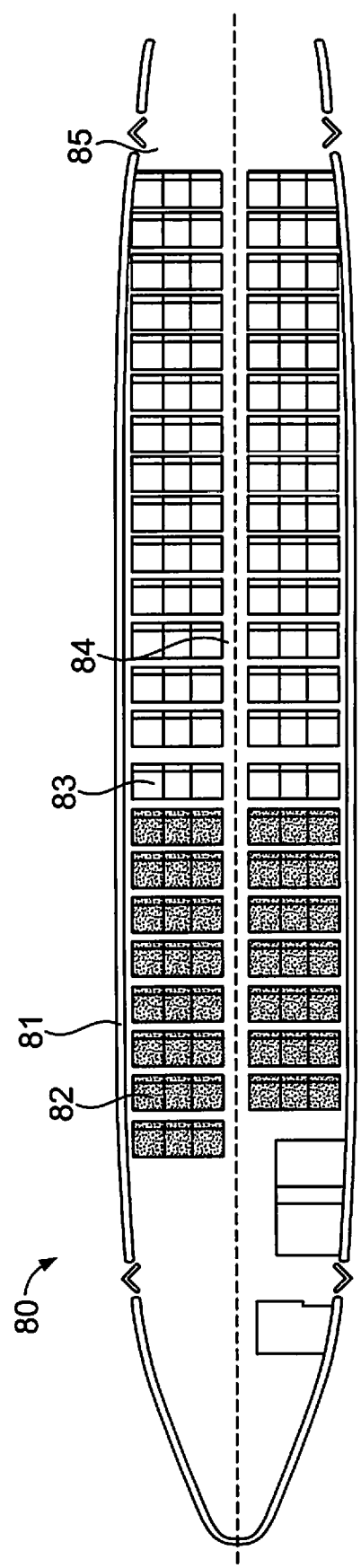
FIG. 2B illustrates a top plan view of an internal cabin of an aircraft, according to an embodiment of the present disclosure.

FIG. 2B illustrates a top plan view of an internal cabin 80 of an aircraft, according to an embodiment of the present disclosure. The internal cabin 80 may be within a fuselage 81 of the aircraft. For example, one or more fuselage walls may define the interior of the internal cabin 80. The internal cabin 80 includes multiple sections, including a main cabin 82 having passenger seats 83, and an aft section 85 behind the main cabin 82. It is to be understood that the internal cabin 80 may include more or less sections than shown.

The internal cabin 80 may include a single aisle 84 that leads to the aft section 85. The single aisle 84 may extend through the center of the internal cabin 80 that leads to the aft section 85. For example, the single aisle 84 may be coaxially aligned with a central longitudinal plane of the internal cabin 80.

FIG. 3 illustrates a perspective interior view of an internal cabin 100 of an aircraft, according to an embodiment of the present disclosure. The internal cabin 100 includes outboard sidewalls 102 connected to a ceiling 104. Windows 106 may be formed within the outboard sidewalls 102. A floor 108 supports rows of seats 110. As shown in FIG. 3, a row 112 may include two seats 110 on either side of an aisle 113. However, the row 112 may include more or less seats 110 than shown. Additionally, the internal cabin 100 may include more aisles than shown.

Passenger service units (PSUs) 114 are secured between an outboard sidewall 102 and the ceiling 104 on either side of the aisle 113. The PSUs 114 extend between a front end and rear end of the internal cabin 100. For example, a PSU 114 may be positioned over each seat 110 within a row 112. Each PSU 114 may include a housing 116 that generally contains vents, reading lights, an oxygen bag drop panel, an attendant request button, and other such controls over each seat 110 (or groups of seats) within a row 112.

Overhead stowage bin assemblies 118 are secured to the ceiling 104 and/or the outboard wall 102 above and inboard from the PSU 114 on either side of the aisle 113. The overhead stowage bin assemblies 118 are secured over the seats 110. The overhead stowage bin assemblies 118 extend between the front and rear end of the internal cabin 100. Each stowage bin assembly 118 may include a pivot bin or bucket 120 pivotally secured to a strongback (hidden from view in FIG. 3). The overhead stowage bin assemblies 118 may be positioned above and inboard from lower surfaces of the PSUs 114. The overhead stowage bin assemblies 118 are configured to be pivoted open in order to receive passenger carry-on baggage and personal items, for example.

As used herein, the term "outboard" means a position that is further away from a central longitudinal plane 122 of the internal cabin 100 as compared to another component. The term "inboard" means a position that is closer to the central longitudinal plane 122 of the internal cabin 100 as compared to another component. For example, a lower surface of a PSU 114 may be outboard in relation to a stowage bin assembly 118.

Figure 4:
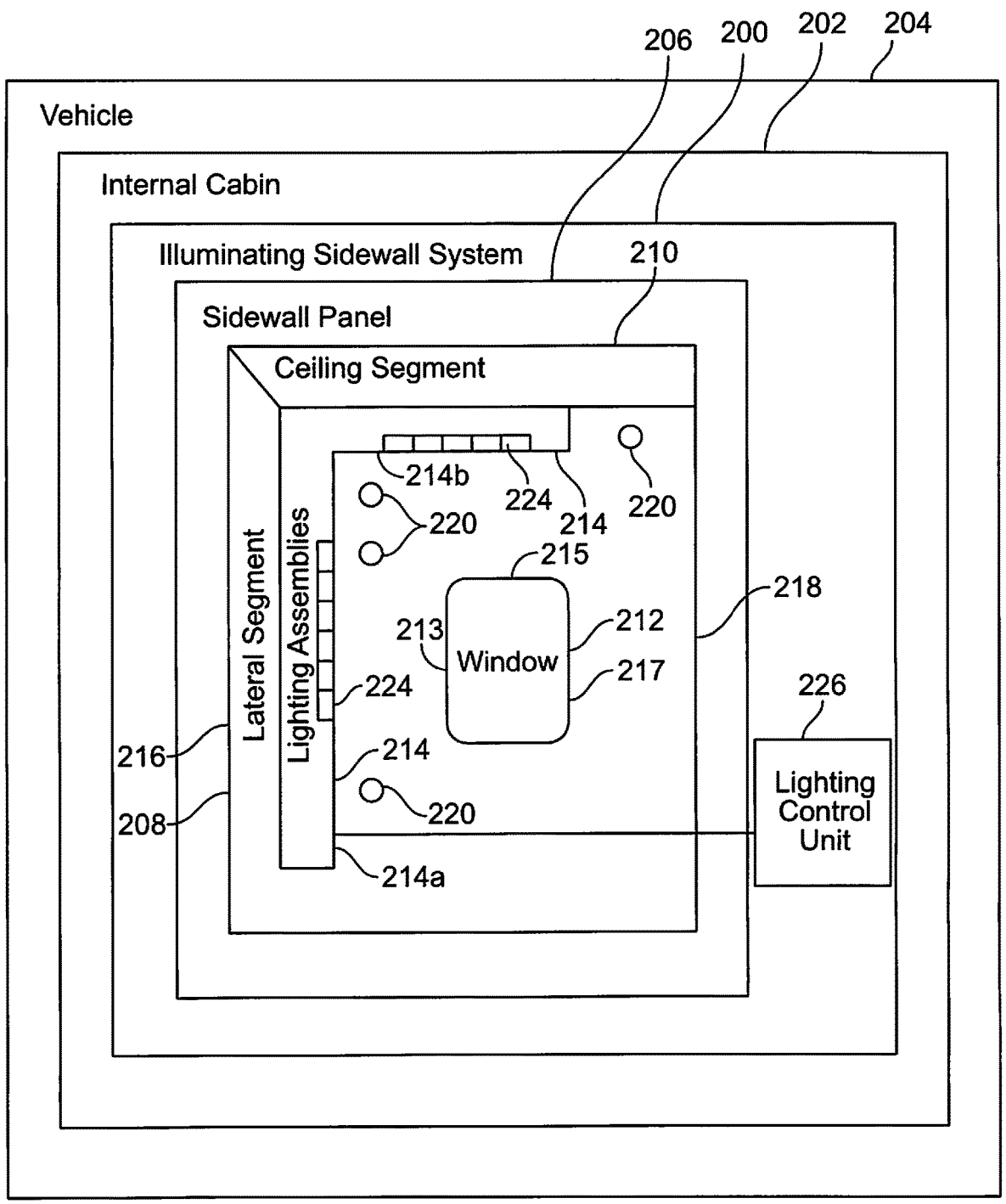
FIG. 4 illustrates a schematic block diagram of an illuminating sidewall system within an internal cabin of a vehicle, according to an embodiment of the present disclosure.

FIG. 4 illustrates a schematic block diagram of an illuminating sidewall system 200 within an internal cabin 202 of a vehicle 204, according to an embodiment of the present disclosure. The internal cabin 202 is an example of the internal cabin 100 shown in FIG. 3. The vehicle 204 may be a commercial aircraft, such as the aircraft 10 shown in FIG. 1.

The illuminating sidewall system 200 includes a sidewall panel 206. The sidewall panel 206 includes a lateral segment 208 connected to a ceiling segment 210. In at least one embodiment, the sidewall panel 206 forms at least part of an outboard sidewall of an internal cabin, such as the outboard sidewall 102 shown in FIG. 3. For example, the lateral segment 208 may form at least a portion of a lateral wall within the internal cabin 202, while the ceiling segment 210 may form at least a portion of a ceiling within the internal cabin 202. The sidewall panel 206 includes at least one window 212. In particular, the window 212 may be formed in the lateral segment 208. The sidewall panel 206 may include one window 212, or multiple windows 212. In at least one embodiment, the sidewall panel 206 may form an entire outboard sidewall and at least a portion of a ceiling of the internal cabin 202.

The window 212 may be or include an opening. That is, the window 212 may or may not include a solid window panel and/or frame. In at least one embodiment, a fuselage of a vehicle is formed from frames, stringers, skins, and/or the like. A window belt area of a fuselage is a reinforced area that is configured to retain a transparent window panel(s), for example. Insulation blankets are secured over portions of the panels, and the sidewall panel(s) 206 are secured over the insulation blankets and internal portions of the fuselage. As such, the sidewall panel 206 may be a decorative structure including the window 212 (which may be an opening that overlies a window belt area of a fuselage) that secures to an underlying structure, such as portions of the fuselage and/or insulation blankets.

One or more lighting assemblies 214 are mounted in relation to the sidewall panel 206. A first portion 214a of the lighting assemblies 214 may be vertically oriented, while a second portion 214b of the lighting assemblies 214 may be horizontally oriented. For example, the first portion 214a may be secured to a rear surface of the lateral segment 208, while the second portion 214b may be secured to an upper surface of the ceiling segment 210. The first portion 214a and the second portion 214b of the lighting assemblies 214 are configured to emit light onto interior portions of the sidewall panel 206. For example, the first portion 214a is configured to emit light onto a front surface (that is, facing a passenger section within the internal cabin 202) of the lateral segment 208, while the second portion 214b is configured to emit light onto a lower surface (that is, facing a passenger section within the internal cabin 202) of the ceiling segment 210, and/or the front surface of the lateral segment 208.

The lighting assemblies 214 may be configured to emit light towards the window 212. For example, the first portion 214a may be configured to emit light towards an onto a side 213 of the window 212, while the second portion 214b may be configured to emit light over, towards, and onto a top 215 of the window 212.

The first portion 214a and/or at least a portion of the second portion 214b of the lighting assemblies 214 may be disposed at, proximate to, or towards a first end 216 of the sidewall panel 206, which is opposite a second end 218. The first end 216 may be a fore end in that it is closer to a front of a vehicle, while the second end 218 may be an aft end in that it is closer to a rear of a vehicle. Optionally, the first end 216 may be the aft end, and the second end 218 may be the fore end. In at least one embodiment, the second portion 214b may extend over at least a portion of a length of the ceiling segment 210. For example, the second portion 214b may extend over an entire top length of the ceiling segment 210.

In at least one embodiment, the lighting assemblies 214 may include one or more portions positioned to an opposite side 217 of the window 212. For example, an additional portion may extend over the end 218. That is, the illuminating sidewall system 200 may include two lateral portions, one of each disposed in relation to the opposite sides 213 and 217 of the window 212.

The lighting assemblies 214 may be securely retained within one or more channels formed in the sidewall panel 206. For example, the channel(s) may be a pocket, recess, and/or bracket formed in the sidewall panel 206. The lighting assemblies 214 may be secured within the channel through one or more fasteners, adhesives, and/or the like. The channels may include open apertures. Light emitted by the lighting assemblies 214 is emitted out of the open apertures onto portions of the sidewall panel 206.

In at least one embodiment, a single lighting assembly 214 may extend over the lateral segment 208 and the ceiling segment 210. In at least one other embodiment, two or more lighting assemblies 214 may extend over the lateral segment and the ceiling segment 210.

In at least one embodiment, the lighting assemblies 214 are separate and distinct from a PSU, such as the PSUs 114 shown in FIG. 3. That is, the lighting assemblies 214 are separate and distinct from light emitting devices of the PSUs. In at least one embodiment, the lighting assemblies 214 are outboard from and/or above the PSU 114.

The lighting assemblies 214 may be mounted behind portions of the sidewall panel 206 and configured to emit light through at least one light-transmissive indicia 220 that allow emitted light to pass therethrough. The lighting assemblies 214 are configured to emit light through the light-transmissive indicia 220. Because at least a portion of the lighting assemblies 214 may be positioned behind the light-transmissive indicia 220, the lighting assemblies 214 may be configured to backlight the light-transmissive indicia 220. The light-transmissive indicia 220 may be or include one or more of a wayfinding indicia (such as a seat number), text, graphics, and/or the like, such as which may be used for company branding purposes. The illuminating sidewall system 200 may include more or less light-transmissive indicia 220 than shown. In at least one embodiment, the illuminating sidewall system 200 may not include the light-transmissive indicia 220.

The lighting assemblies 214 include one or more light-emitting elements 224, such as light-emitting diodes (LEDs) that are configured to be operated to emit light that may be selectively changed between different colors (such as red-orange-yellow-green-blue-indigo, violet, and mixes of colors therebetween). In at least one embodiment, a single light-emitting element 224 may be used. For example, a single tubular lighting element may be encased in a tubular transparent cover that conforms to a shape of the sidewall panel 206. In at least one other embodiment, multiple light-emitting elements may be used.

The lighting assemblies 214 may be operatively coupled to a lighting control unit 226, such as through one or more wired or wireless connections. The lighting control unit 226 may be secured to the sidewall panel 206. Optionally, the lighting control unit 226 may be remotely located from the sidewall panel 206. For example, the lighting control unit 226 may be within another portion of the internal cabin 202, such as within a cockpit, galley station, or the like. The lighting control unit 226 may be in communication with lighting assemblies 214 of a plurality of sidewall panels 206 within the internal cabin 202. Alternatively, the lighting control unit 226 may be in communication with lighting assemblies 214 of only one sidewall panel 206. Examples of lighting assemblies are shown and described in U.S. Pat. No. 9,527,437, entitled "Lighting Assembly for Internal cabin of a Vehicle," which is hereby incorporated by reference in its entirety.

The lighting assemblies 214 may be disposed to the side 213 and over the top 215 of the window 212, as shown in FIG. 4. The lighting assemblies 214 may be or include linear portions positioned to the side 213 and over the top 215 of one or more windows 212. Optionally, the lighting assemblies 214 may be curved, circular, and/or the like. In at least one embodiment, the lighting assemblies 214 include a flexible, transparent housing that retains the plurality of light-emitting elements 224. In this manner, the lighting assembly 214 conforms to the contours of the sidewall panel 206.

In operation, the lighting control unit 226 controls operation of the lighting assemblies 214. For example, an individual may select a color of light to be emitted by the light-emitting element(s) 224, and activate the light-emitting element(s) 224 via an interface coupled to the lighting control unit 226. Light emitted by the lighting assemblies 214 is directed towards and onto interior surfaces of the lateral segment 208 and the ceiling segment 210 of the sidewall panel 206. Further, the emitted light from the lighting assemblies 214 may be emitted through the light-transmissive indicia 220.

Accordingly, the lighting assemblies 214 are used to provide light having desired properties (for example, desired color(s) and effect(s)) onto interior surfaces of the sidewall panel 206. The properties (for example, color, intensity, luminosity, radiance, flickering, timed staggering of light-emitting elements 224 to provide motion effects, and/or the like) of the light may be customized and controlled through the lighting control unit 226.

As used herein, the term "control unit," "central processing unit," "unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the lighting control unit 226 may be or include one or more processors that are configured to control operation of the lighting assemblies 214, as described herein.

The lighting control unit 226 is configured to execute a set of instructions that are stored in one or more data storage units or elements (such as one or more memories), in order to process data. For example, the lighting control unit 226 may include or be coupled to one or more memories. The data storage units may also store data or other information as desired or needed. The data storage units may be in the form of an information source or a physical memory element within a processing machine.

The set of instructions may include various commands that instruct the lighting control unit 226 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein illustrate one or more control or processing units, such as the lighting control unit 226. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the lighting control unit 226 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 6:
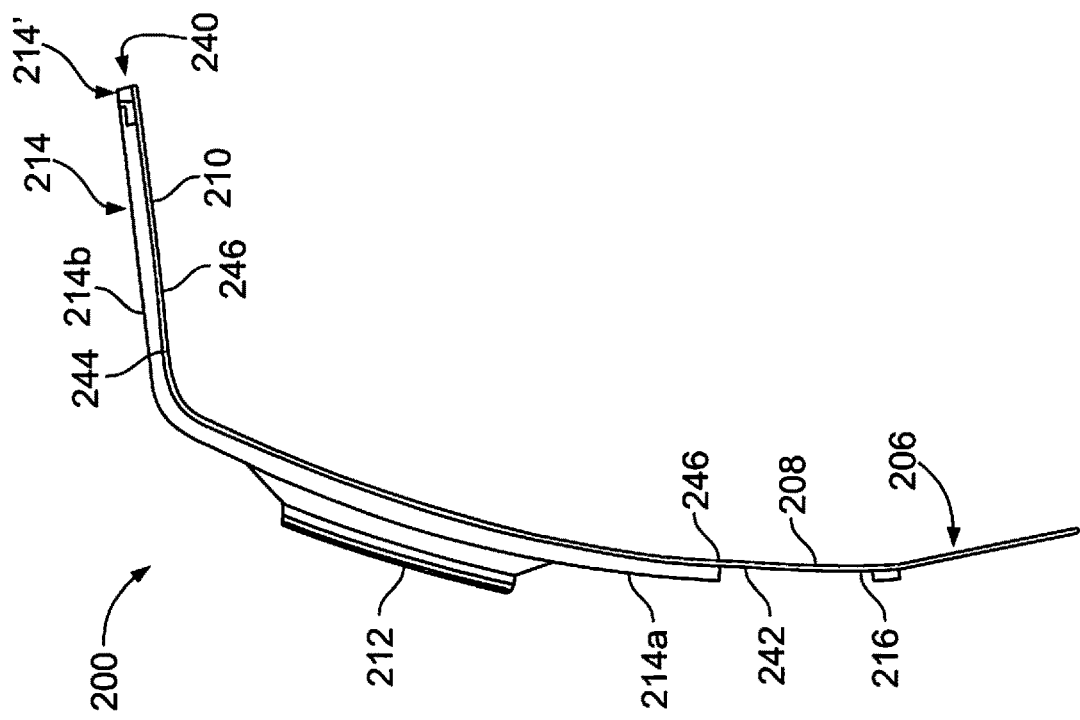
FIG. 6 illustrates an end view of an illuminating sidewall system, according to an embodiment of the present disclosure.
Figure 5:
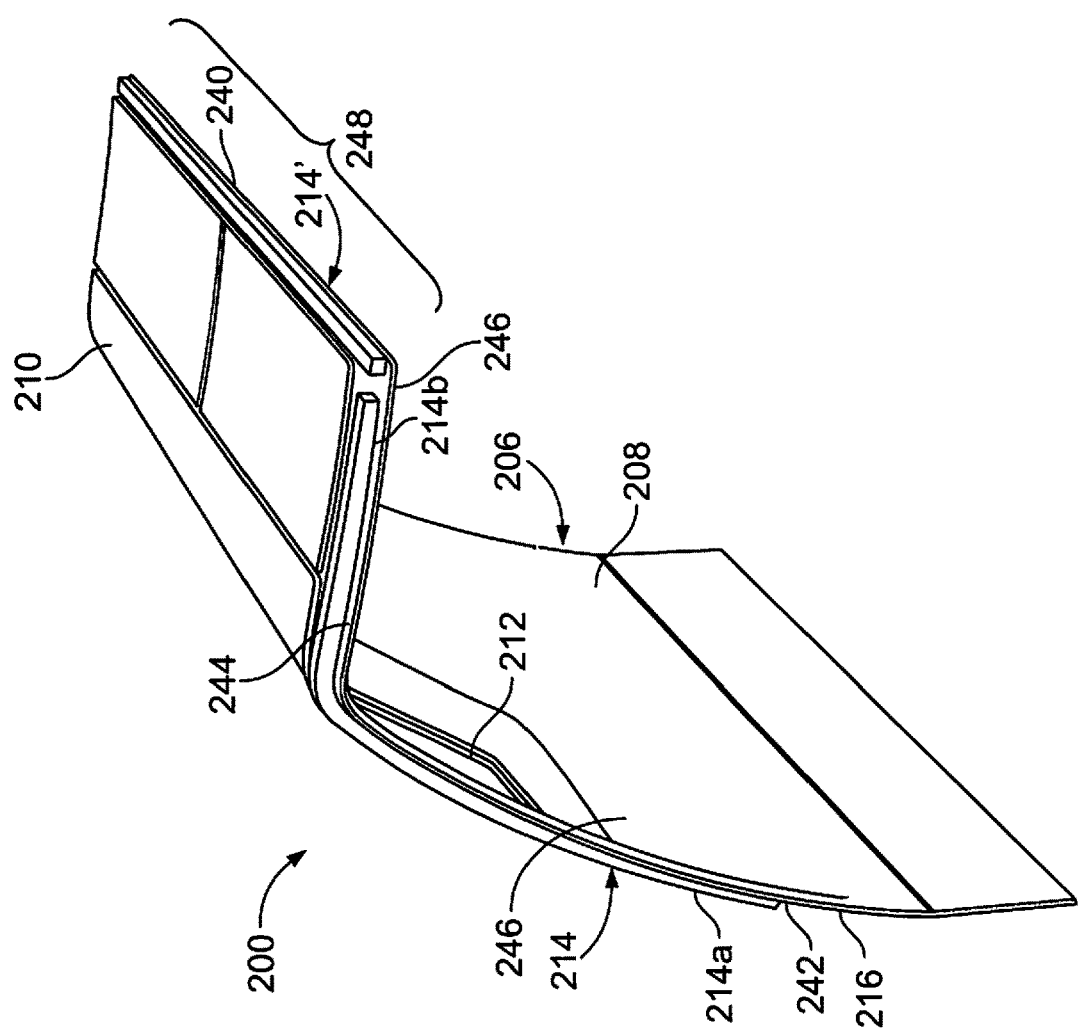
FIG. 5 illustrates a perspective end view of an illuminating sidewall system, according to an embodiment of the present disclosure.
Figure 7:
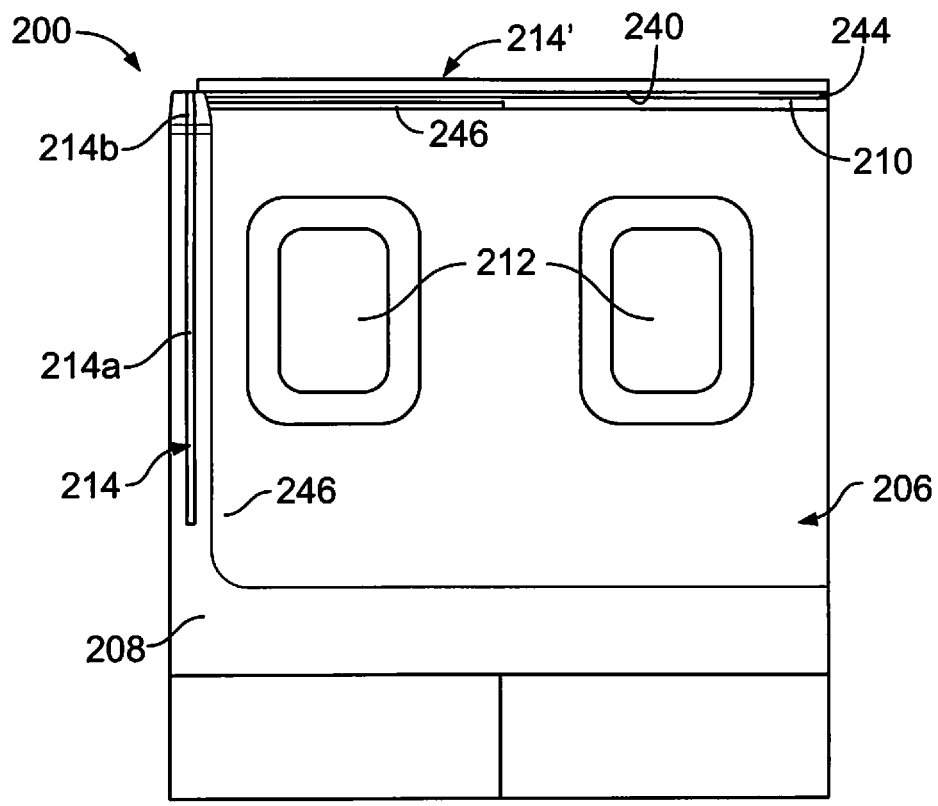
FIG. 7 illustrates a front view of an illuminating sidewall system, according to an embodiment of the present disclosure.

FIG. 5 illustrates a perspective end view of the illuminating sidewall system 200, according to an embodiment of the present disclosure. FIG. 6 illustrates an end view of the illuminating sidewall system 200. FIG. 7 illustrates a front view of the illuminating sidewall system 200. Referring to FIGS. 5-8, a first lighting assembly 214 is secured to the sidewall panel 206 at or otherwise proximate to the end 216, while a second lighting assembly 214' is secured to the ceiling segment 210 at or proximate to a front edge 240. The second lighting assembly 214' provides a third portion of the lighting assemblies 214 shown in FIG. 1, for example.

The first lighting assembly 214 may be a single lighting assembly 214 that is secured to a rear surface 242 of the lateral segment 208, and an upper surface 244 of the ceiling segment 210. In at least one other embodiment, the first lighting assembly 214 may include multiple lighting assemblies. The first lighting assembly 214 is configured to emit light onto interior surfaces 246 of the sidewall panel 206, such as through apertures formed in and/or through the sidewall panel 206. As shown, the profile of the first lighting assembly 214 forms an inverted L shape that conforms to the contours of the profile of the sidewall panel 206.

The second lighting assembly 214' may be a single lighting assembly 214 that is secured to the upper surface 244 along at least a portion of the length 248 of the ceiling segment 210. In at least one other embodiment, the second lighting assembly 214' may include multiple lighting assemblies. In at least one embodiment, the first lighting assembly 214 and the second lighting assembly 214' may be integrally formed together as a single lighting assembly. The second lighting assembly 214' is configured to emit light onto the interior surfaces 246 of the sidewall panel 206, such as through apertures formed in and/or through the sidewall panel 206. Optionally, the illuminating sidewall system 200 may not include the second lighting assembly 214'.

Optionally, the first lighting assembly 214 and/or the second lighting assembly 214' may be embedded within portions of the sidewall panel 206, instead of being mounted to rear and/or upper portions. In at least one other embodiment, the first lighting assembly 214 and/or the second lighting assembly 214' may be secured to interior surfaces 246 of the sidewall panel 206.

Figure 8:
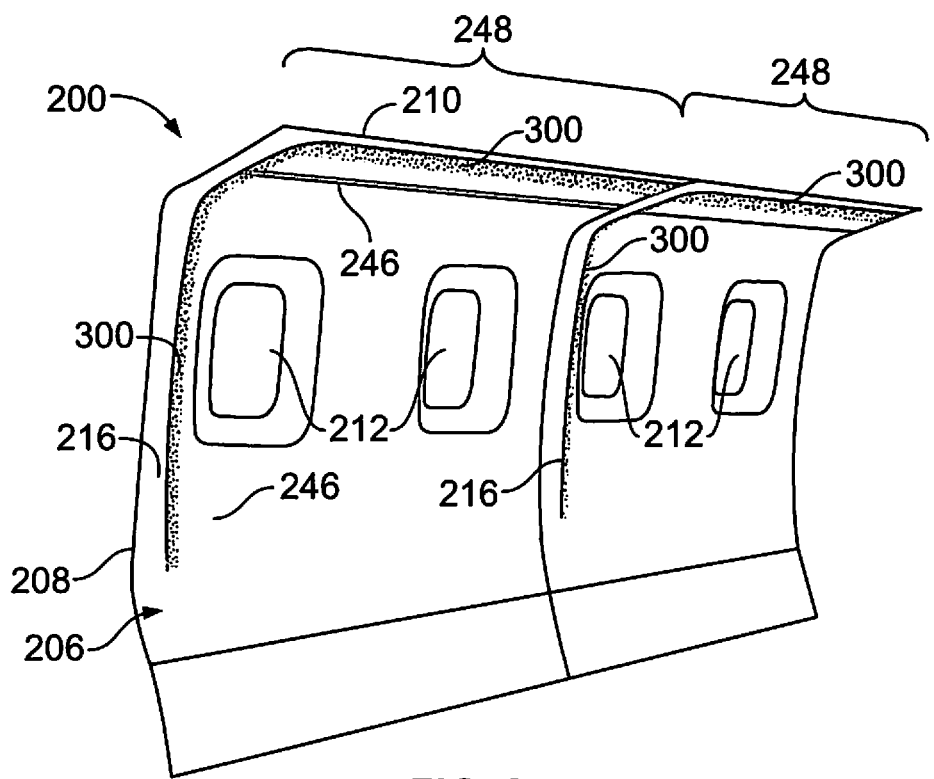
FIG. 8 illustrates a perspective front view of an illuminating sidewall system, according to an embodiment of the present disclosure.

FIG. 8 illustrates a perspective front view of the illuminating sidewall system 200, according to an embodiment of the present disclosure. Referring to FIGS. 5-8, the lighting assemblies 214 and 214' emit light 300 onto the interior surfaces 246 of the sidewall panel 206 on the lateral segment 208 and the ceiling segment 210 proximate to the end 216, and along a length of the ceiling segment 210, such as in an inverted and extended L-shape.

In at least one embodiment, the lighting assemblies 214 and 214' may be configured to emit the light 300 onto scalloped (for example, inwardly recessed) portions of the interior surfaces 246, such as may surround portions of the windows 212. In at least one embodiment, the lighting assemblies 214 and 214' are configured to illuminate a PSU and areas around at least a portion of the windows 212 to provide functional lighting and accent lighting. For example, the lighting assemblies 214' may extend over one or more PSUs and illuminate portions thereof. In at least one other embodiment, the lighting assemblies 214 and/or 214' may be configured to illuminate areas around or otherwise proximate to the windows 212.

Figure 9:
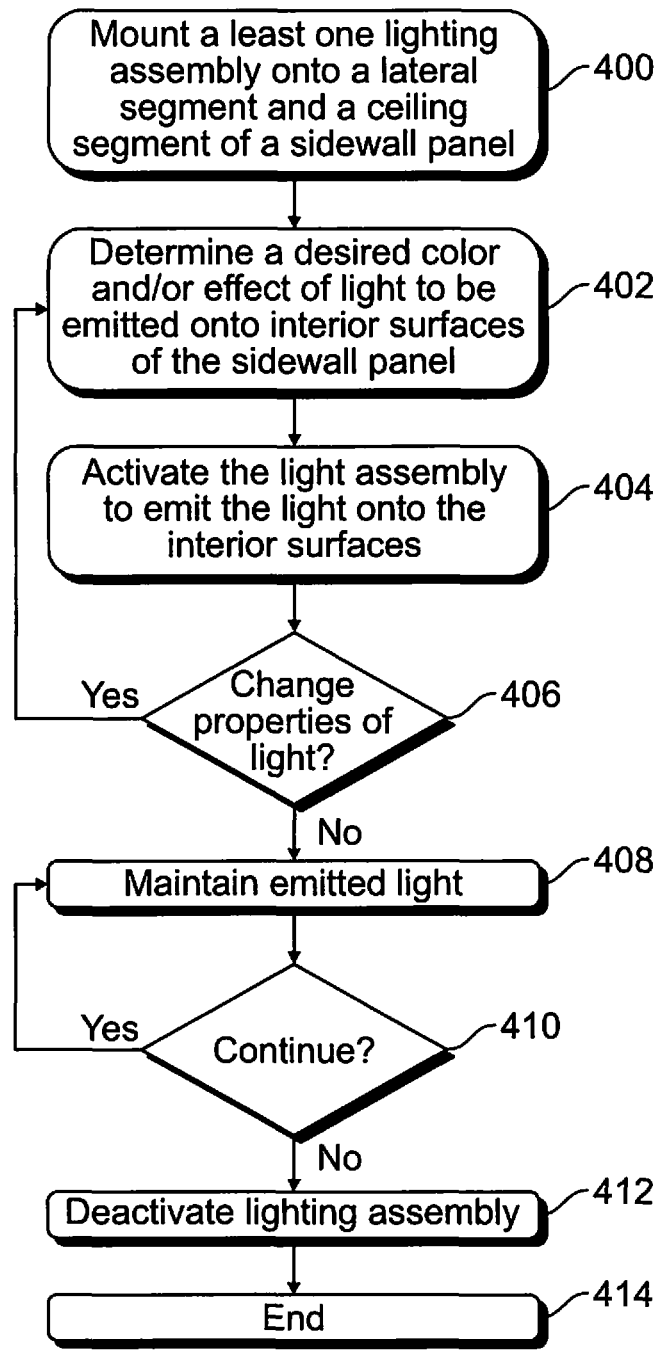
FIG. 9 illustrates a flow chart of a method of operating an illuminating sidewall system, according to an embodiment of the present disclosure.

FIG. 9 illustrates a flow chart of a method of operating an illuminating sidewall system, according to an embodiment of the present disclosure. Referring to FIGS. 4-9, the method begins at 400, at which at least one lighting assembly 214 (and/or 214') is mounted onto the lateral segment 208 and the ceiling segment 210 of the sidewall panel 206.

At 402, a desired color and/or effect of light to be emitted onto the interior surfaces 246 of the sidewall panel 206 is determined. At 404, the light assembl(ies) 214 is then activated to emit the light 300 onto the interior surfaces 246.

At 406, it is determined whether the properties of the light are to be changed. If the properties of the light are to be changed, the method returns to 402. If, however, the properties of the light are not to be changed, the method proceeds from 406 to 408, at which the emitted light 300 is maintained.

At 410, it is determined whether or not to continue emitting the light 300. If emission of the light 300 is to be continued, the method returns to 408. If, however, the emission of the light 300 is to cease, the method proceeds from 410 to 412, at which the lighting assembl(ies) 412 is deactivated, and then the method ends at 414.

As described herein, embodiments of the present disclosure provide systems and methods of adaptively modifying sidewalls within an internal cabin of a vehicle, such as through one or more lighting effects. Further, embodiments of the present disclosure provide systems and methods that allow for adaptive customization of portions of sidewalls within an internal cabin of an aircraft. Also, embodiments of the present disclosure are configured to provide an inviting, aesthetically-pleasing sidewall within an internal cabin of an aircraft.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An illuminating sidewall system for an internal cabin of a vehicle, the illuminating sidewall system comprising:
   a sidewall panel including a lateral segment connected to a ceiling segment, and at least one window; and
   at least one lighting assembly having a first portion secured to the lateral segment and a second portion secured to the ceiling segment, wherein the at least one lighting assembly has an inverted L-shaped profile that conforms to a profile of the sidewall panel, wherein the at least one lighting assembly is configured to emit light onto interior surfaces of one or both of the lateral segment and the ceiling segment.

2. The illuminating sidewall system of claim 1, wherein the first portion is secured to a rear surface of the lateral segment, and wherein the second portion is secured to an upper surface of the ceiling segment.

3. The illuminating sidewall system of claim 1, wherein one or both of the first portion and the second portion are configured to emit the light towards the at least one window.

4. The illuminating sidewall system of claim 1, wherein one or both of the first portion and the second portion is disposed at a first end of the sidewall panel.

5. The illuminating sidewall system of claim 1, wherein the at least one lighting assembly comprises a third portion that extends along a length of the ceiling segment.

6. The illuminating sidewall system of claim 5, wherein the third portion is proximate to a front edge of the ceiling segment.

7. The illuminating sidewall system of claim 1, wherein the lighting assembly is separate and distinct from a personal service unit.

8. The illuminating sidewall system of claim 1, wherein the sidewall panel comprises at least one light-transmissive indicia, wherein at least a portion of the at least one lighting assembly is positioned behind the light-transmissive indicia, and wherein the at least one lighting assembly is configured to emit the light through the light-transmissive indicia.

9. The illuminating sidewall system of claim 1, wherein the at least one lighting assembly comprises one or more light emitting diodes (LEDs).

10. The illuminating sidewall system of claim 1, further comprising a lighting control unit that is coupled to the lighting assembly, wherein the lighting control unit is configured to control operation of the at least one lighting assembly.

11. An illuminating sidewall method for an internal cabin of a vehicle, the illuminating sidewall method comprising:
    providing a sidewall panel including a lateral segment connected to a ceiling segment, and at least one window;
    forming at least one lighting assembly to have an inverted L-shaped profile that conforms to a profile of the sidewall panel;
    mounting a first portion of the at least one lighting assembly to the lateral segment;
    mounting a second portion the at least one light assembly to the ceiling segment; and
    emitting light from the at least one lighting assembly onto interior surfaces of one or both of the lateral segment and the ceiling segment.

12. The illuminating sidewall system of claim 1, wherein the at least one lighting assembly includes light-emitting elements configured to emit light over a color range including red-orange-yellow-green-blue-indigo-violet, and mixtures therebetween.

13. The illuminating sidewall method of claim 11, wherein the providing comprises:
    securing the first portion to a rear surface of the lateral segment; and
    securing the second portion to an upper surface of the ceiling segment.

14. The illuminating sidewall method of claim 11, wherein the providing comprises disposing one or both of the first portion and the second portion at a first end of the sidewall panel.

15. The illuminating sidewall method of claim 11, wherein the providing comprises extending a third portion of the at least one lighting assembly along a length of a front edge of the ceiling segment.

16. The illuminating sidewall method of claim 11, wherein the lighting assembly is separate and distinct from a personal service unit.

17. The illuminating sidewall method of claim 11, wherein the emitting comprises emitting the light through light-transmissive indicia of the sidewall panel.

18. The illuminating sidewall method of claim 11, further comprising controlling operation of the at least one lighting assembly with a lighting control unit.

19. The illuminating sidewall method of claim 11, wherein the emitting light comprises emitting light over a color range including red-orange-yellow-green-blue-indigo-violet, and mixtures therebetween.

20. A vehicle comprising:
   an internal cabin; and
   an illuminating sidewall system within the internal cabin, the illuminating sidewall system comprising:
      a sidewall panel including a lateral segment connected to a ceiling segment, and at least one window;
      at least one lighting assembly having a first portion secured to the lateral segment, a second portion secured to the ceiling segment, and a third portion that extends along a length of the ceiling segment, wherein the at least one lighting assembly is configured to emit light onto interior surfaces of one or both of the lateral segment and the ceiling segment, wherein the at least one lighting segment has an inverted L-shaped profile that conforms to a profile of the sidewall panel; and
      a lighting control unit that is coupled to the lighting assembly, wherein the lighting control unit is configured to control operation of the lighting assembly.

* * * * *